United States Patent
Mutter et al.

(10) Patent No.: US 12,425,265 B2
(45) Date of Patent: Sep. 23, 2025

(54) SUBSCRIBER STATION FOR A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Franz Bailer, Moessingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/633,586

(22) Filed: Apr. 12, 2024

(65) Prior Publication Data

US 2024/0380634 A1 Nov. 14, 2024

(30) Foreign Application Priority Data

May 8, 2023 (DE) ...................... 10 2023 204 239.8

(51) Int. Cl.
*H04L 12/40* (2006.01)

(52) U.S. Cl.
CPC .. *H04L 12/40013* (2013.01); *H04L 12/40136* (2013.01); *H04L 2012/40215* (2013.01)

(58) Field of Classification Search
CPC ......... H04L 12/40013; H04L 12/40136; H04L 2012/40215
See application file for complete search history.

(56) References Cited

U.S. PATENT DOCUMENTS 12,284,264 B2 * 4/2025 Mutter .................... H04L 7/033
2024/0267255 A1 * 8/2024 Mutter .............. H04L 12/40013

FOREIGN PATENT DOCUMENTS

EP 3691197 A1 * 8/2020 ......... G05B 19/0423

OTHER PUBLICATIONS

Bosch, CAN XL—The Next Step in CAN Evolution, Jul. 2023 (Year: 2023).*
ISO 11898-1:2015 Standard, "Road Vehicles—Controller Area Network (CAN) -Part 1: Data Link Layer and Physical Signalling," 2015, pp. 1-74.

* cited by examiner

*Primary Examiner* — Henry Tsai
*Assistant Examiner* — Christopher A Daley
(74) *Attorney, Agent, or Firm* — NORTON ROSE FULBRIGHT US LLP (57) ABSTRACT

A subscriber station for a serial bus system. The subscriber station has a communication control device, and a re-integration module for re-integrating the communication control device into a communication on the bus to temporarily synchronize the communication control device to a signal transmitted from the at least one other subscriber station of the bus system, which signal is created based on a frame for communication in the bus system. The re-integration module checks at least one predetermined re-integration condition to decide whether the operating mode of the communication control device is or is not to be switched into an operating mode for transmitting frames to the bus and/or for receiving frames from the bus, and uses in its check at least one predetermined re-integration condition having a sequence of bits in which the value of the last bit differs from that of the preceding bits.

17 Claims, 5 Drawing Sheets

SUBSCRIBER STATION FOR A SERIAL BUS SYSTEM AND METHOD FOR COMMUNICATION IN A SERIAL BUS SYSTEM

CROSS REFERENCE

The present application claims the benefit under 35 U.S.C. § 119 of German Patent Application No. DE 10 2023 204 239.8 filed on May 8, 2023, which is expressly incorporated herein by reference in its entirety.

FIELD

The present invention relates to a subscriber station for a serial bus system and to a method for communication in a serial bus system which when required operates with a selectable data rate and/or communication standard, and yet with a high error robustness and a high net data transmission rate.

BACKGROUND INFORMATION

Bus systems are used in many fields of technology for communication between technical devices, such as sensors and controllers. In some bus systems, technical devices are intended to communicate with one another, where applicable being able to switch as required between different standards and/or rates for the data transmission or communication between the subscriber stations of the bus system. For example, this is the case in vehicles in which, depending on the type and/or number of functions of a technical system or a vehicle, the transmission of data volumes of different sizes is to be made possible.

Currently, Classical CAN and/or CAN FD, which are both standardized in the international standard ISO 11898-1: 2015, are used for communication between devices in vehicles and/or in other technical devices. The near future will see the introduction of CAN XL, which is specified in document CiA610-1 and is compatible with CAN FD. In such a CAN-bus-based communication, a frame is used for generating a transmission signal, the frame being divided into an arbitration phase and a data phase. In the arbitration phase, negotiations are held between the subscriber stations of the bus system as to which of the subscriber stations of the bus system will get exclusive access to the bus in the following data phase and then be allowed to send its data to the bus. In CAN FD and in CAN XL, the bits of the transmission signal are generated with a shorter bit time in the data phase than in the arbitration phase—in other words, with a higher bit rate—and sent to the bus. With the aid of SIC and SIC XL transmitting/receiving devices, which are also called transceivers, bit rates up to 8 Mbit/s are possible in the data phase with CAN FD and bit rates up to 20 Mbit/s with CAN XL. On the other hand, the bit rate remains at approximately 500 kbit/s in the arbitration phase in order to make arbitration possible.

When signals are transmitted to the bus and also when signals are received from the bus, it is therefore necessary to switch back and forth between a slow operating mode and a fast operating mode. In addition, error-free communication in the bus system in particular calls for good synchronization between the subscriber stations.

In a bus system in which communication is also carried out with different standards the following must also be ensured. Each subscriber station must also tolerate signals received from the bus which were created using a frame standard which the subscriber station itself does not support and for this reason is not able to decode. If such a case occurs, in CAN the subscriber stations are designed to assume a protocol exception event (PAE), and thereby to go into a state in which the subscriber station does not disturb the current communication on the bus, doing so for example via an error frame. In the aforementioned CAN communication standards this state is called re-integration or re-integration mode. A CAN node re-integrates in order to be able to take part in communication again, i.e. to be able to transmit and receive.

In the re-integration state or mode, the subscriber station of the CAN-based bus system ultimately ascertains when communication changes back to a communication standard known to the subscriber station. For this purpose, the subscriber station checks whether it detects a predetermined idle condition. The idle condition is detected according to the ISO 11898-1:2015 standard when the subscriber station has sampled a recessive bit on the CAN bus 11 times in succession. The idle condition can also be referred to as a waiting or pause condition.

However, it is problematic if a first subscriber station re-integrates again but is not synchronized to the transmitter or transmitting node (second subscriber station) on the CAN bus which last transmitted to the bus. This case occurs only in special situations, but can lead to a first subscriber station detecting the 11 bits of the known idle condition earlier than at least one other subscriber station of the bus system. If the first subscriber station then begins to transmit a frame immediately after re-integration, the at least one other subscriber station on the bus, which in the re-integration state has previously counted fewer than 11 recessive bits, evaluates this such that the predetermined idle condition is not present.

For this reason, this at least one other subscriber station incorrectly remains in the re-integration state and cannot receive the frame sent by the first subscriber station. This is at least undesirable. This may result in errors in the operation of devices connected to the bus system.

SUMMARY

It is an object of the present invention to provide a subscriber station for a serial bus system and a method for communication in a serial bus system which solve the aforementioned problems. In particular, a subscriber station for a serial bus system and a method for communication in a serial bus system are to be provided in which a high error robustness and a high net data transmission rate of the communication can be realized even when different communication standards and bit rates are used in the arbitration phase and the data phase.

This object may be achieved by a subscriber station for a serial bus system having features of the present invention. According to an example embodiment of the present invention, the subscriber station has a communication control device for controlling a communication of the subscriber station with at least one other subscriber station of the bus system and for evaluating a signal received from a bus of the bus system, in which the bit time in a first communication phase can differ from a bit time in a second communication phase, and a re-integration module for re-integrating the communication control device into a communication on the bus in order to temporally synchronize the communication control device to a signal transmitted from the at least one other subscriber station of the bus system, which signal is created on the basis of a frame for communication in the bus system, wherein the re-integration module is designed to check at least one predetermined re-integration condition in order to decide whether the operating mode of the communication control device is or is not to be switched into an operating mode for transmitting frames to the bus and/or for receiving frames from the bus, and wherein the re-integration module is designed to use in its check at least one predetermined re-integration condition having a sequence of bits in which the value of the last bit differs from that of the preceding bits.

The design of the described subscriber station according to the present invention prevents the subscriber station from incorrectly remaining in the re-integration state despite the predetermined idle condition no longer being present on the bus but the predetermined re-integration condition now being present instead, on the basis of which the subscriber station is to be switched into the operating mode of the arbitration phase. The above-described error can thereby be avoided. If the predetermined idle condition is present, the communication control device will be switched to the idle state or waiting state or standby state. That is to say, the communication control device is waiting for the reception of a message. In this state, no communication takes place on the bus. In other words, no signal is received at the RXD terminal of the communication control device or the value is logical 1, since the recessive level on the bus corresponds to a logical 1 in the digital reception signal.

In particular, the subscriber station described can avoid a special situation in which a first subscriber station has already completed re-integration earlier than after the 11 bits of the known re-integration condition. If, in this situation, this first subscriber station then begins to transmit a frame immediately after re-integration, other subscriber stations on the bus, which in the re-integration state have previously only counted 10 recessive bits, evaluate this in this specific situation in such a way that the predetermined re-integration condition is not present. As a result thereof, these other subscriber stations incorrectly remain in the re-integration state and thus cannot receive the frame sent by the first subscriber station.

In order to solve the problems of these special situations, the described subscriber station according to an example embodiment of the present invention is advantageously designed in such a way that it changes or is switched in good time and correctly from the re-integration state into the operating mode of the arbitration phase or into an operating mode for receiving. The described subscriber station can therefore always receive all frames from the bus. As a result, the subscriber station has the desired function, so that malfunctions due to incorrect re-integration or non-re-integration in the operation of the bus system can at best be excluded or at least minimized for the technical devices connected to the bus system.

Accordingly, the described subscriber station according to the present invention also contributes to a CAN communication in which a switchover between two bit rates of different sizes takes place becoming more robust or more reliable. The described subscriber station is in particular robust as regards local disturbances on the bus.

With the subscriber station, error signaling can also be used in a bus system in which messages are sent in accordance with CAN or CAN FD or CAN XL, without the net data rate thereby being lowered. Even when error signaling is activated, the subscriber station makes possible reliable and robust communication with CAN FD or CAN XL.

According to an example embodiment of the present invention, it is also advantageous that the described embodiment of the subscriber station can be implemented in an uncomplicated and thus cost-effective manner for achieving the aforementioned object.

According to an example embodiment of the present invention, it is thus possible with the subscriber station in the bus system to maintain an arbitration from CAN in a first communication phase, and nevertheless with a transmission of frames according to Classical CAN or CAN FD or CAN XL to increase as required the transmission rate compared with conventional Classical CAN or CAN FD or CAN XL.

The subscriber station according to the present invention described herein also makes it possible for at least two subscriber stations to be present in the bus system which send messages to the bus according to different CAN standards. In the bus system, for example, in addition to two CAN XL subscriber stations, at least one other subscriber station can thus also be present which sends messages to the bus according to a different CAN standard.

Advantageous further embodiments of the subscriber station of the present invention are disclosed herein.

The communication control device can be designed to synchronize in re-integration mode to an edge in a predetermined field of the predetermined frame.

The communication control device can be designed to restart a search in re-integration mode for an idle or standby condition every time the communication control device has detected a falling edge in the error in the signal received from the bus.

The last bit of the at least one predetermined re-integration condition is possibly a start bit of a next frame which the subscriber station receives from the bus.

For the bits currently received from the bus, the re-integration module can be designed to check a second predetermined re-integration condition in addition to a first predetermined re-integration condition in order to decide whether the operating mode of the communication control device is or is not to be switched into an operating mode for transmitting and/or receiving frames. In this case, the first predetermined re-integration condition can have a predetermined number of consecutive bits which all have the same bit value, while the second predetermined re-integration condition has a sequence of bits in which the logical value of the last bit differs from the logical value of the preceding bits of the sequence of bits.

According to one exemplary embodiment of the present invention, the number of bits of the first and the second predetermined re-integration condition is the same.

It is possible for the communication control device to be designed to synchronize to an edge during a re-integration of the re-integration module, said edge being an edge of a bit of the predetermined re-integration condition.

According to one exemplary embodiment of the present invention, the re-integration module is designed to evaluate an edge to which the communication control device synchronizes and which is present after a sample point of a 10th bit in the sequence of bits of the second predetermined re-integration condition as the beginning of a start bit of the next frame on the bus.

According to an example embodiment of the present invention, the re-integration module may be designed, in an operating mode for re-integration, to restart a search for the predetermined re-integration condition in the signal received from the bus every time the re-integration module has detected a falling edge in the signal received from the bus, which edge is not evaluated by the re-integration module as the beginning of a start bit of the next frame on the bus.

According to one exemplary embodiment of the present invention, the re-integration module is designed to switch the communication control device after the edge into an operating mode for transmitting and receiving frames, wherein the re-integration module is designed to instruct the communication control device to transmit without a start bit a frame to be transmitted and to start the transmission of the frame to be transmitted with the first bit of its identifier.

According to one exemplary embodiment of the present invention, the re-integration module is designed to switch the communication control device after the edge into an operating mode only for receiving frames if the communication control device currently does not have a frame to be transmitted.

According to one embodiment variant of the present invention, the re-integration module has a detection block for detecting the logical value of bits and the number of successive bits with the same logical value in a signal received from the bus, an evaluation block for evaluating a detection result of the detection block on the basis of at least one re-integration condition, and a mode switch block for switching the operating mode of the communication control device on the basis of the evaluation performed by the evaluation block.

The communication control device can be designed to sample and evaluate the at least one signal received from the bus, which signal is based on a transmission signal generated by another subscriber station, doing so according to a predetermined frame.

According to one example embodiment of the present invention, the above-described subscriber station is a Classical CAN subscriber station and/or a CAN FD subscriber station.

According to another example embodiment of the present invention, the above-described subscriber station is a CAN FD subscriber station and/or a CAN XL subscriber station.

Additionally or alternatively, according to an example embodiment of the present invention, the communication control device can be designed to, in the first communication phase, negotiate with the other subscriber stations as to which of the subscriber stations of the bus system will be given at least temporarily exclusive, collision-free access to the bus in the subsequent second communication phase.

The subscriber station according to the present invention described above can be part of a bus system which additionally comprises a bus and at least two subscriber stations which are connected to one another via the bus in such a way that they can communicate in series with one another. At least one of the at least two subscriber stations is an above-described subscriber station. In addition, each of the at least two subscriber stations also has a transmitting/receiving device for transmitting a transmission signal to the bus of the bus system and/or for receiving a signal from the bus of the bus system.

The aforementioned object may also be achieved by a method for communication in a serial bus system. The method is carried out with a subscriber station of the bus system which comprises a communication control device and a re-integration module. According to an example embodiment of the present invention, the method comprises the steps of controlling, with the communication control device, a communication of the subscriber station with at least one other subscriber station of the bus system and evaluating a signal received from a bus of the bus system, in which signal the bit time in a first communication phase can differ from a bit time in a second communication phase, and performing a re-integration with the re-integration module for re-integrating the communication control device in a communication on the bus in order to temporally synchronize the communication control device to a signal transmitted from the at least one other subscriber station of the bus system, which signal is created on the basis of a frame for communication in the bus system, wherein the re-integration module checks at least one predetermined re-integration condition in order to decide whether the operating mode of the communication control device is or is not to be switched into an operating mode for transmitting frames to the bus and/or receiving frames from the bus, and wherein the re-integration module uses in its check at least one predetermined re-integration condition having a sequence of bits in which the value of the last bit differs from the preceding bits.

The method of the present invention offers the same advantages as those mentioned above in relation to the subscriber station of the present invention.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments.

In the figures, identical or functionally identical elements are given the same reference signs unless otherwise indicated.

DETAILED DESCRIPTION OF EXAMPLE EMBODIMENTS

Figure 1:
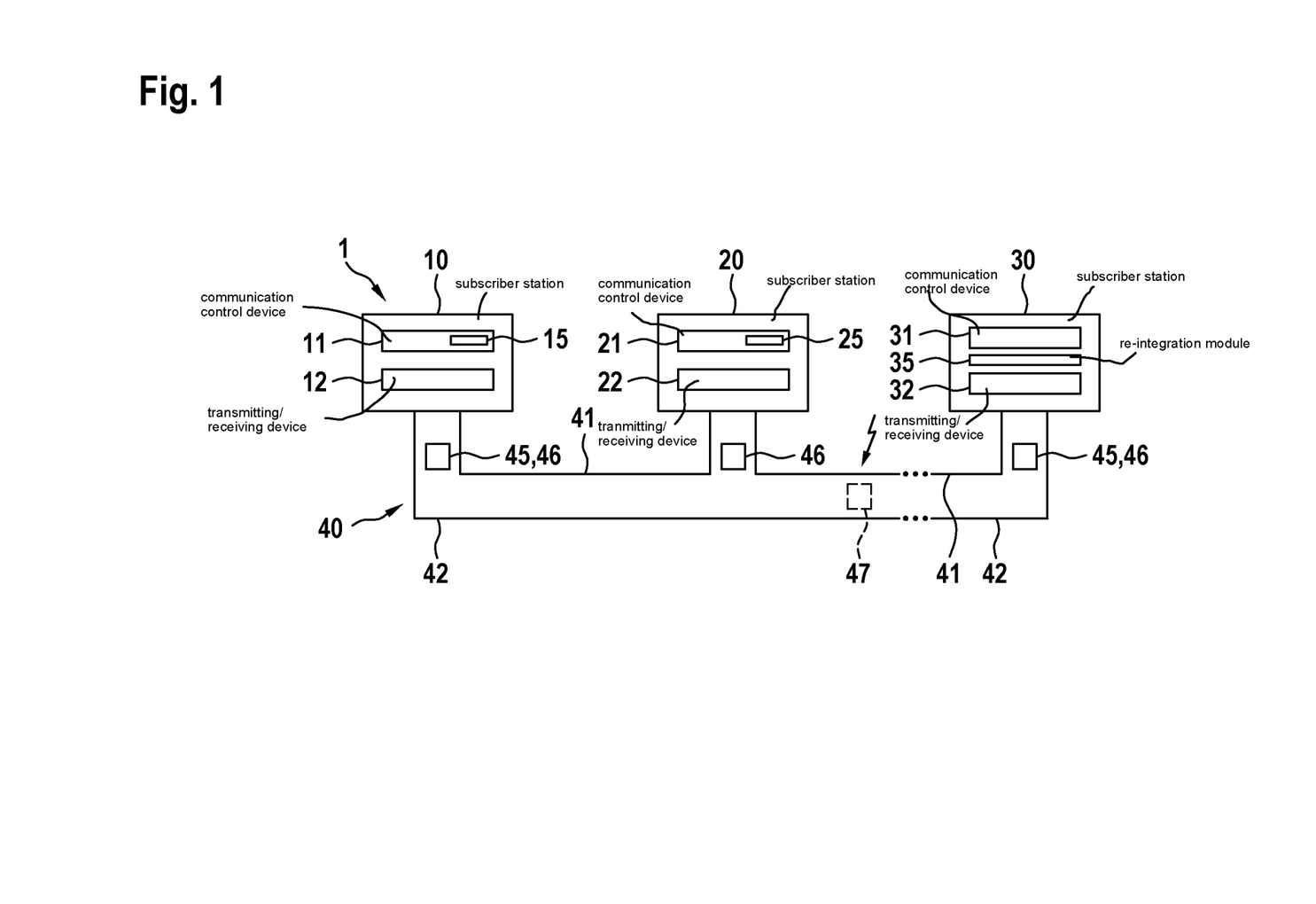
FIG. 1 shows a simplified block diagram of a bus system according to a first exemplary embodiment of the present invention.

FIG. 1 shows an example of a bus system 1, which is in particular fundamentally designed for a CAN bus system, a CAN FD bus system, a CAN XL bus system, and/or modifications thereof, as described below. The bus system 1 can be used in a vehicle, in particular a motor vehicle, an aircraft, etc., or in a hospital, etc.

In FIG. 1, the bus system 1 has a plurality of subscriber stations 10, 20, 30, which are each connected to a bus 40 with a first bus wire 41 and a second bus wire 42. The bus wires 41, 42 can also be referred to as CAN_H and CAN_L and are used for electrical signal transmission after the coupling-in of the dominant levels or generation of recessive levels or other levels for a signal in the transmission state. Messages 45, 46 in the form of signals can be transmitted between the individual subscriber stations 10, 20, 30 in series via the bus 40. If an error occurs during communication on the bus 40, as shown by the jagged black block arrow in FIG. 1, an error frame 47 with an error flag and an error delimiter can optionally be transmitted. The subscriber stations 10, 20, 30 of FIG. 1 are, for example, control devices, sensors, display devices, etc. of a motor vehicle or of another technical system.

As shown in FIG. 1, the subscriber station 10 has a communication control device 11, a transmitting/receiving device 12 and a re-integration module 15. The subscriber station 20 has a communication control device 21, a transmitting/receiving device 22 and a re-integration module 25. The subscriber station 30 has a communication control device 31, a transmitting/receiving device 32 and a re-integration module 35. The transmitting/receiving devices 12, 22, 32 of the subscriber stations 10, 20, 30 are each directly connected to the bus 40, even when this is not shown in FIG. 1.

The communication control devices 11, 21, 31 are each used for controlling a communication of the relevant subscriber station 10, 20, 30 via the bus 40 with at least one other subscriber station of the subscriber stations 10, 20, 30 which are connected to the bus 40. For this purpose, the communication control devices 11, 31 create and/or read first messages 45 which are, for example, CAN FD messages 45. The CAN FD messages 45 are formed on the basis of a CAN FD format, which is described in more detail with reference to FIG. 2. For this purpose, the communication control devices 11, 31 create a transmission signal TxD, which is described in more detail below with reference to FIG. 2 or FIG. 3 or FIG. 7. In addition, the communication control devices 11, 31 read or decode a reception signal RxD, which is described in more detail below with reference to FIG. 8 to FIG. 10.

The communication control devices 11, 31 can also be designed to provide, depending on requirements, a CAN FD message 45 or a CAN XL message 46 for the transmitting/receiving device 32 or to receive it from the latter. The respective re-integration modules 15, 35 are used here too. The CAN XL messages 46 are formed on the basis of a CAN XL format, which is described in more detail with reference to FIG. 3. The communication control devices 11, 31 thus create and read a first message 45 or a second message 46, wherein the first and second messages 45, 46 differ in their data transmission standard, namely in this case CAN FD or CAN XL.

The communication control device 21 can be designed as a conventional CAN controller according to ISO 11898-1: 2015, i.e., as a CAN FD-tolerant Classical CAN controller or a CAN FD controller. In addition, the re-integration module 25 is present, which can have the same function as the re-integration modules 15, 35. The communication control device 21 creates and reads first messages 45, for example CAN FD messages 45. In the case of the CAN FD messages 45, a number of 0 to 64 data bytes can be included, which are in addition transmitted at a significantly faster data rate than in the case of a Classical CAN message. In particular, the communication control device 21 is designed as a conventional CAN FD controller.

The transmitting/receiving device devices 12, 32 can be designed as required in order to provide messages 45 according to the CAN FD format or messages 46 according to the current CAN XL format for the associated communication control device 11, 31 or to receive them from the latter.

The transmitting/receiving device 22 can be designed as a conventional CAN transmitting/receiving device according to ISO 11898-1:2015 or a CAN FD transmitting/receiving device.

With the two subscriber stations 10, 30, a formation and then a transmission of messages 46 with the CAN XL format and the reception of such messages 46 can be realized.

Figure 2:
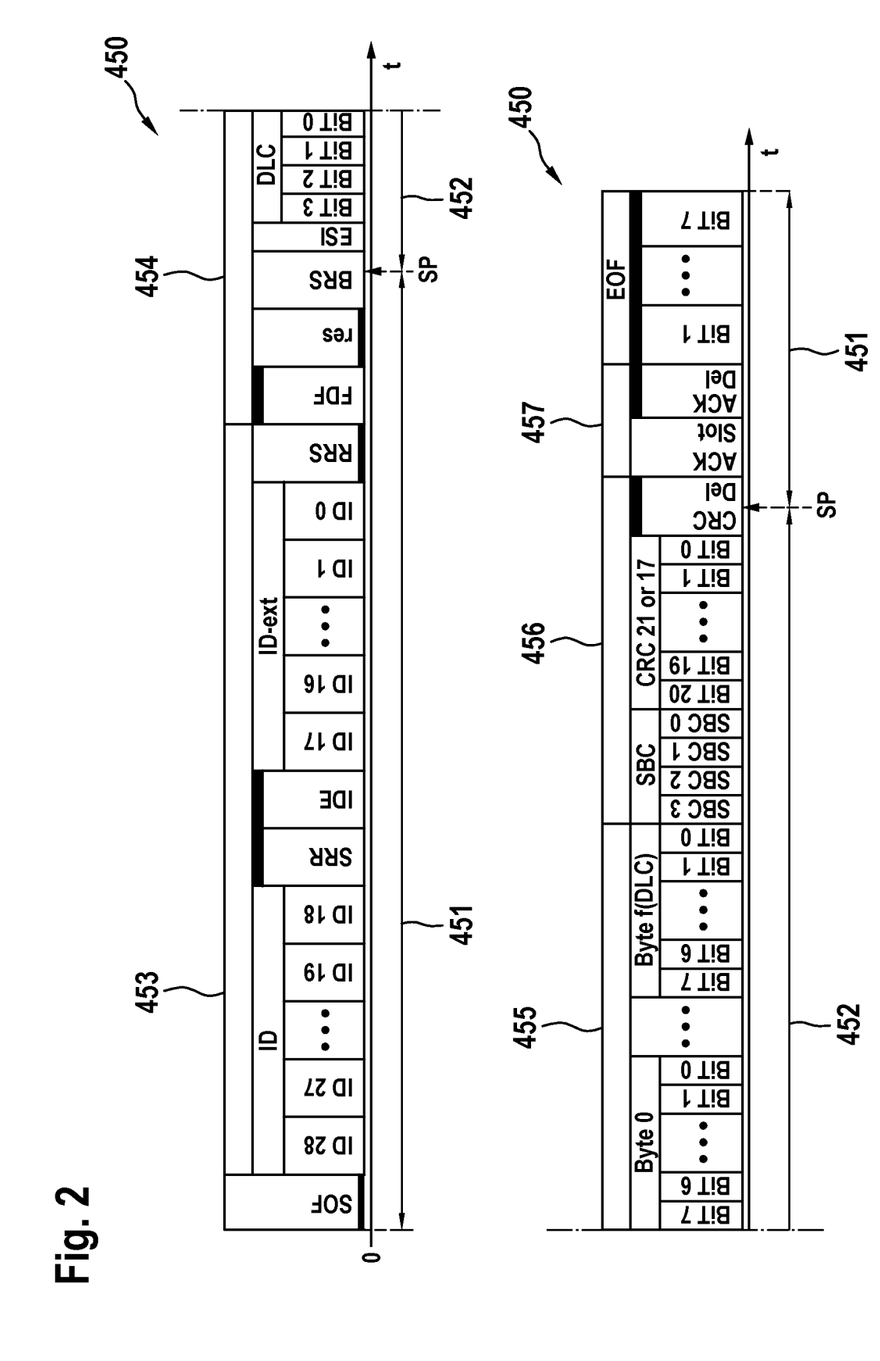
FIG. 2 shows the format of CAN FD frames according to the aforementioned standard ISO 11898-1:2015 for a message that can be sent from a transmitting/receiving device for a subscriber station of the bus system according to the first exemplary embodiment of the present invention.

FIG. 2 shows a frame 450 created by one of the subscriber stations 10, 30 in the CAN FD format for a message 45 with up to 64 data bytes. The CAN FD frame 450 is provided by one of the communication control devices 11, 21, 31, namely encoded in a digital transmission signal TxD, for the associated transmitting/receiving device 12, 22, 32 for transmitting to the bus 40.

The frame 450 is divided into two communication phases, which are called the arbitration phase 451 and the data phase 452. The frame 450 begins and ends in the arbitration phase 451. The frame 450 begins with an SOF bit and has an arbitration field 452, a control field 453, a data field 454, a checksum field 455 (CRC field), a confirmation field 457 (ACK=acknowledge), and an end of frame field EOF (EOF=end of frame). Bits in the arbitration phase 451 of the frame 450 have a longer bit time than bits of the data phase 452, as illustrated in FIG. 2 by way of example.

Bits shown with a thick line on their lower line in FIG. 2 are transmitted in the frame 450 as dominant or '0.' Bits shown with a thick line on their upper line in FIG. 2 are transmitted in the frame 450 as recessive or '1.' Such bits, which are shown in FIG. 2 with a thick line, have a predetermined permanent or fixed value in the frame 450.

The arbitration field 453 comprises an identifier of the frame 450 in the base ID field and in the ID-ext field. The identifier has 29 bits. An SRR bit and an IDE bit are provided between the base-ID field and the ID-ext field. An RRS bit is arranged at the end of the arbitration field 453.

The control field 454 begins with an FDF bit, followed by a res bit. These are followed by a BRS bit and an ESI bit. The control field 454 ends with a DLC field in which the length of the following data field 455 is encoded. The res bit must be sent for the frame 450 with a logical value 0, in other words as (logical) 0, i.e. dominant. However, if the subscriber station 20 receives a res bit with a logical value 1, in other words as a (logical) 1, i.e. recessive, the receiving subscriber station 20 will see a protocol exception event (PAE) and go into the state or into the operating mode of re-integration.

The data field 455 will not be present if the DLC field of the control field 453 has the value 0. The data field 455 has a length corresponding to the value encoded in the DLC field. The value can be up to 64 bytes, as mentioned above.

The checksum field 456 contains in a field SBC the number of stuff bits modulo 8 which have been inserted into the frame 450 according to the bit stuffing rule, namely that following five identical bits, a bit inverse thereto is to be inserted in each case. In addition, the checksum field 456 in a CRC field contains a CRC checksum and, following this, ends with a CRC delimiter CRC-Del.

The confirmation field 457 contains an ACK-Slot bit in which subscriber stations, which currently are only receivers of the frame 450 but not transmitters of the frame, can confirm or not confirm the correct reception of the frame 450 from the bus 40. The confirmation field 457 ends with an ACK-Del bit, which is also called ACK delimiter.

A bit sequence is provided in the end-of-frame field EOF, which bit sequence marks the end of the frame 450. The bit sequence of the end field (EOF) thus serves to mark the end of the frame 450. The end field (EOF), together with the ACK delimiter, ensures that a number of 8 recessive bits is transmitted at the end of the frame 450. This is a bit sequence that cannot occur within the frame 450. As a result, the end of the frame 450 can be reliably detected by the subscriber stations 10, 20, 30.

After the end field (EOF), an interframe space (IFS), not shown in FIG. 2, follows in the frame 450. In CAN FD this interframe space (IFS) is designed in accordance with ISO 11898-1:2015. The interframe space (IFS) has at least 3 bits.

Otherwise, the fields and bits mentioned are from ISO 11898-1:2015 and for this reason are not described in more detail here.

In the case of CAN FD, in the arbitration phase 451, with the aid of an identifier (ID) with bits ID28 to ID18 in the arbitration field 453, negotiation takes place bit by bit between the subscriber stations 10, 20, 30 as to which subscriber station 10, 20, 30 wishes to send the message 45, 46 with the highest priority and will therefore receive exclusive access to the bus 40 of the bus system 1 for the next time for transmission in the subsequent data phase 452. A physical layer such as in CAN and CAN FD is used in the arbitration phase 451.

The physical layer corresponds to the bit transmission layer or layer 1 of the conventional OSI model (Open Systems Interconnection Model).

An important point during the phase 451 is that the conventional CSMA/CR method is used, which allows simultaneous access of the subscriber stations 10, 20, 30 to the bus 40 without the higher-priority message 45, 46 being destroyed. As a result, further bus subscriber stations 10, 20, 30 can be added relatively easily to the bus system 1, which is very advantageous.

The CSMA/CR method requires that there must be so-called recessive states on the bus 40, which can be overwritten by other subscriber stations 10, 20, 30 with dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use. With the new CAN SIC physical layer, even 5 megabits per second and up to 8 megabits per second are possible.

In the data phase 452, in addition to a portion of the control field 454 of a frame 450, the useful data of the CAN FD frame 450 or of the message 45 are transmitted from the corresponding data field 455 as well as the associated checksum field 456. The switchover from the data phase 452 back to the arbitration phase 451 then takes place.

The subscriber station 10 as the transmitter of the message 45, 46 does not begin transmitting bits of the data phase 452 to the bus 40 until the subscriber station 10 as the transmitter has won the arbitration and the subscriber station 10 as transmitter thus has exclusive access to the bus 40 of the bus system 1 for transmitting. The same applies to the subscriber stations 20, 30 when they want to transmit a message 45 or 46 to the bus 40.

Figure 3:
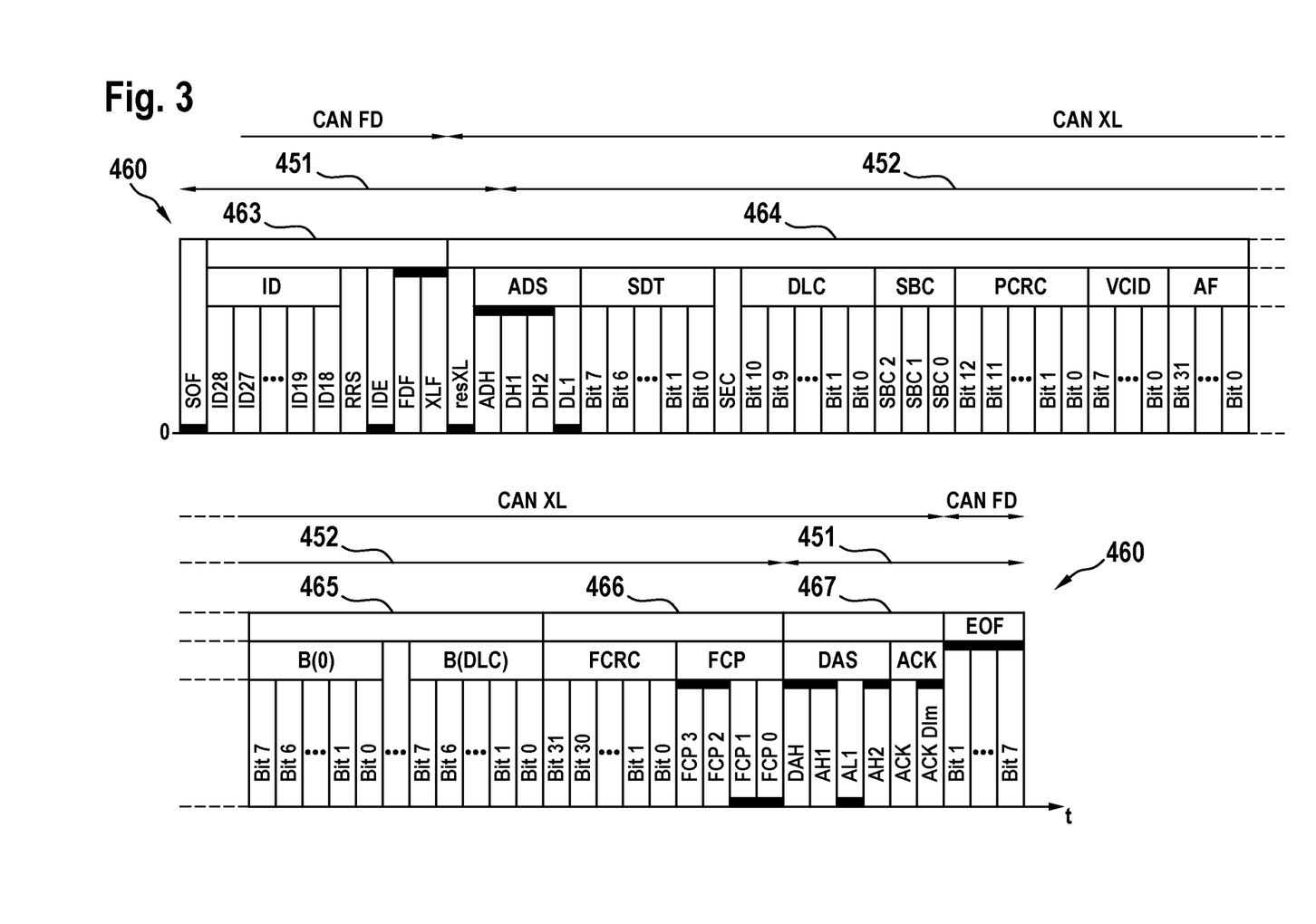
FIG. 3 shows the format of CAN XL frames according to the aforementioned standard CiA610-1 for a message which CAN be sent from a transmitting/receiving device for a subscriber station of the bus system according to the first exemplary embodiment as an alternative to the CAN FD frame of FIG. 2.

FIG. 3 shows, for the message 46, a CAN XL frame 460 as is provided by communication control device 11, namely encoded in a digital transmission signal TxD, for the transmitting/receiving device 12 for transmission to the bus 40. In this case, the communication control device 11 creates the frame 460 in the present exemplary embodiment as compatible with CAN FD, as also illustrated in FIG. 3. The same applies analogously to the communication control device 31 and the transmitting/receiving device 32 of the subscriber station 30.

According to FIG. 3, the CAN XL frame 460 is divided for CAN communication on the bus 40 into different communication phases 451, 452, namely the arbitration phase 451 and the data phase 452. Following a start bit (SOF), the frame 460 has an arbitration field 463, a control field 464 with an ADS field for a switchover between the communication phases 451, 452, a data field 465, a checksum field 466, and also a frame termination field 467. This is followed by the end-of-frame field EOF, as in the case of a frame 450 according to FIG. 2.

In the arbitration phase 451, the arbitration is also executed for the frame 460 with the aid of the identifier (ID), as described above with reference to FIG. 2. In the data phase 452, in addition to a portion of the control field 464 of the frame 460, the useful data of the CAN XL frame 460 or of the message 46 are transmitted from the data field 465 as well as the checksum field 466. In the case of CAN XL according to FIG. 3, the DAS field then follows, which serves for switching from the data phase 452 back to the arbitration phase 451.

As shown in FIG. 3, in the arbitration phase 451 the subscriber station 10 uses as the first communication phase partially, in particular up to the FDF bit (inclusive), a format from CAN/CAN FD according to ISO 11898-1:2015, as shown in FIG. 2. In contrast, the subscriber station 10 uses as the second communication phase a CAN XL format, which is described below, from the FDF bit in the first communication phase as well as in the data phase 452. In the CAN XL data phase 452, symmetrical '1' and '0' levels are used for the transmission on the bus 40, rather than recessive and dominant levels as in CAN FD.

In general, two different stuffing rules are applied in the generation of the frame 460. Up until the FDF bit in the arbitration field 453, the dynamic bit stuffing rule of CAN FD applies or for a frame 450 of FIG. 2, so that after 5 identical bits in succession, an inverse stuff bit is to be inserted. In the data phase 452 up to the FCP field a fixed stuffing rule applies so that a fixed stuff bit must be inserted after a fixed number of bits. Alternatively, instead of only one stuff bit, a number of 2 or more bits can be inserted as fixed stuff bits.

In the present exemplary embodiment, the res bit from CAN FD, which is denoted by the XLF bit in the frame 460, is used for switching from the CAN FD format to the CAN XL format. For this reason, the frame formats of CAN FD and CAN XL are identical up to the res bit or XLF bit. A receiver can only identify at the res bit the format in which the frame 460 is transmitted. A CAN XL subscriber station, that is to say in this case the subscriber stations 10, 30, also supports CAN FD. If the XLF bit is transmitted as 1, i.e. recessively, it thereby identifies the frame 460 as a CAN XL frame. For a CAN FD frame of FIG. 2, the communication control device 11 sets the XLF bit as 0, i.e. dominant.

After the XLF bit, a resXL bit follows in the frame 460, which is a dominant bit for future use. The resXL must be sent for the frame 460 as 0, i.e. dominant. However, if the subscriber station 10 receives a resXL bit as 1, that is to say recessive, the receiving subscriber station 10 will, for example, see a protocol exception event PAE, and proceed as is done in the case of a CAN FD message 46 for a res=1. Alternatively, the resXL bit could be defined exactly inversely, that is to say that it must be transmitted as 1, that is to say recessive. In this case, in the case of a dominant resXL bit, the receiving subscriber station sees the protocol exception event PAE and changes its operating mode to re-integration.

The resXL bit is followed in the frame 460 by a sequence ADS (arbitration data switch) in which a predetermined bit sequence is encoded. This bit sequence permits a simple and reliable switching from the bit rate of arbitration phase 451 (arbitration bit rate) to the bit rate of the data phase 452 (data bit rate). Optionally, within the ADH bit, the operating mode of the transmitting/receiving device 12, 32 is switched from the operating mode B_451 (SLOW) of the arbitration phase 451 into one of two operating modes B_452_TX, B_452_RX of the data phase 452. The two operating modes of the data phase 452 are an operating mode B_452_TX (FAST_TX) for a transmitting node that is allowed to transmit its signal to the bus 40 in the data phase 452, and an operating mode B_452_RX (FAST_RX) for a receiving node which is only the receiver of the signal from the bus 40.

Subsequent fields up to the beginning of the data field 465 are not described in more detail here. The data field 465 can have up to 2048 bytes.

The data field 465 is followed in the frame 460 by the checksum field 466 with a frame checksum FCRC and an FCP field. Here FCP=frame check pattern. The FCP field consists of 4 bits with in particular the bit sequence 1100. A receiving node uses the FCP field to check whether the receiving node is bit-synchronous with the transmission data stream. In addition, a receiving node synchronizes to the falling edge in the FCP field.

The FCP field is followed by the frame termination field 467. The frame termination field 467 consists of two fields, namely the DAS field, and the confirmation field or ACK field with the at least one ACK bit and the ACK-Dlm bit.

The DAS field contains the DAS sequence (data arbitration switch) in which a predetermined bit sequence is encoded. This DAH, AH1, AL1 bit sequence permits a simple and reliable switchover from the data bit rate of the data phase 452 to the arbitration bit rate of the arbitration phase 451. In addition, during the DAS field, the operating mode of the transmitting/receiving device 12, 32, is optionally switched from one operating mode B_452_TX or B_452_RX (FAST) to the operating mode B_451 (SLOW).

Within the DAH bit, the physical layer, i.e. the operating mode of the transmitting/receiving device 12, 32, is switched from FAST_TX or FAST_RX to SLOW. The AH1 bit is followed by the AL1 bit (logical 0) and the AH2 bit (logical 1). The two bits DAH and AH1 ensure that there is enough time for the operating mode switching of the transmitting/receiving device 11, and that all subscriber stations 10, 30 see a recessive level of significantly more than one arbitration bit time before the edge at the beginning of the AL2 bits (logical 0). This ensures a reliable synchronization for the subscriber stations of the bus system.

In the frame termination field 467, the sequence of the DAS field is followed by the confirmation field (ACK). In the confirmation field, bits are provided for confirming or not confirming a correct reception of the frame 460.

In the frame 460 the frame termination field 467 is followed by the end field (EOF=end of frame), as in the case of CAN FD according to FIG. 2.

For subscriber stations of which the error signaling is not activated and which transmit a CAN XL frame, the end field (EOF) has a length which is different depending on whether a dominant bit or a recessive bit has been seen in the ACK bit. If the transmitting subscriber station has received the ACK bit as dominant, the end field (EOF) will have a number of 7 recessive bits. Otherwise, the end field (EOF) will only be 5 recessive bits long.

In the frame 450 the end field (EOF) is followed by an interframe space (IFS), as explained above with respect to the frame 450 of FIG. 2.

Figure 4:
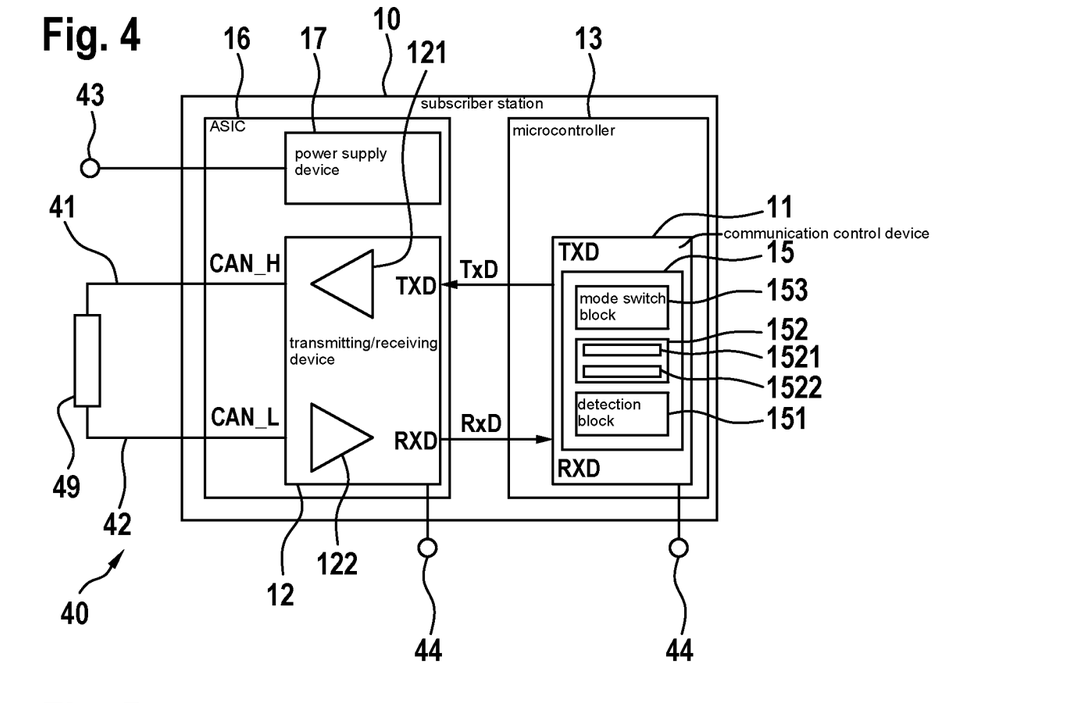
FIG. 4 shows a simplified schematic block diagram of a subscriber station of the bus system according to the first exemplary embodiment of the present invention.

FIG. 4 shows the basic structure of the subscriber station 10 having the communication control device 11, the transmitting/receiving device 12 and the re-integration module 15, which is part of the communication control device 11. In the subscriber station 20, the re-integration module 25 is partially identical in structure to the re-integration module 15, as described in more detail below with reference to FIG. 7 to FIG. 9. The subscriber station 30 is constructed in a similar manner, as shown in FIG. 4, but the re-integration module 35 according to FIG. 1 is arranged separately from the communication control device 31 and the transmitting/receiving device 32. For this reason, the subscriber station 30 is not described separately.

According to FIG. 4, the subscriber station 10 has, in addition to the communication control device 11 and the transmitting/receiving device 12, a microcontroller 13 to which the communication control device 11 is assigned, and an ASIC system 16 (ASIC=application-specific integrated circuit), which can alternatively be a system basis chip (SBC) on which a plurality of functions necessary for an electronic module of the subscriber station 10 are combined. In the ASIC 16 system, a power supply device 17 which supplies the transmitting/receiving device 12 with electrical energy is installed in addition to the transmitting/receiving device 12. The power supply device 17 usually supplies a voltage CAN_supply of 5 V. Depending on requirements, however, the power supply device 17 can provide a different voltage with a different value. Additionally or alternatively, the power supply device 17 can be designed as a current source.

The re-integration module 15 has a detection block 151, an evaluation block 152 and a mode switch block 153.

The detection block 151 can have at least one counter and/or at least one logical circuit for counting the successive bits with the same value and/or an operational amplifier for realizing the reception threshold Ta. For detection, the detection block 151 increments or decrements, for example, the at least one counter by a predetermined value when a bit of a frame 450 or 460 has been received correctly.

The evaluation block 152 has a first evaluation unit 1521 and a second evaluation unit 1522, which are designed to evaluate the detection result of the detection block 151.

In the subscriber station 20, the re-integration module 25 comprises a first evaluation unit 1521, whereas the second evaluation unit 1522 is either not present or can be switched off at least temporarily, as described in more detail below with reference to FIG. 7 to FIG. 9.

The mode switch block 153 is controlled by the evaluation block 152 in order to switch the operating mode of the communication control device 11 in accordance with the evaluation result of the evaluation block 152.

The blocks 151, 152, 153 are described in more detail below.

The transmitting/receiving device 12 also has a transmitting module 121 and a receiving module 122. Although reference is always made to the transmitting/receiving device 12 below, it is alternatively possible to provide the receiving module 122 in a separate device externally from the transmitting module 121. The transmitting module 121 and the receiving module 122 can be constructed as in a conventional transmitting/receiving device 22. The transmitting module 121 can in particular have at least one operational amplifier and/or a transistor. The receiving module 122 can in particular have at least one operational amplifier and/or a transistor.

The transmitting/receiving device 12 is connected to the bus 40, more specifically its first bus wire 41 for CAN_H and its second bus wire 42 for CAN_L. The voltage supply for the power supply device 17 for supplying the first and second bus wires 41, 42 with electrical energy, in particular with the voltage CAN-Supply, is effected via at least one terminal 43. The connection to ground or CAN_GND is realized via a terminal 44. The first and second bus wires 41, 42 are terminated with a terminating resistor 49.

In the transmitting/receiving device 12, the first and second bus wires 41, 42 are connected not only to the transmitting module 121, which is also referred to as a transmitter, but also to the receiving module 122, which is also referred to as a receiver, although the connections are not shown in FIG. 4 for the sake of simplicity.

During operation of the bus system 1, the transmitting module 121 can convert a transmission signal TXD of the communication control device 11, which is transmitted via terminals TXD, into corresponding signals CAN_H, CAN_L for CAN or CAN FD, and into signals CAN_XL_H, CAN_XL_L in the case of CAN XL, for the bus wires 41, 42, and at the terminals for CAN_H and CAN_L transmits these signals to the bus 40.

Figure 5:
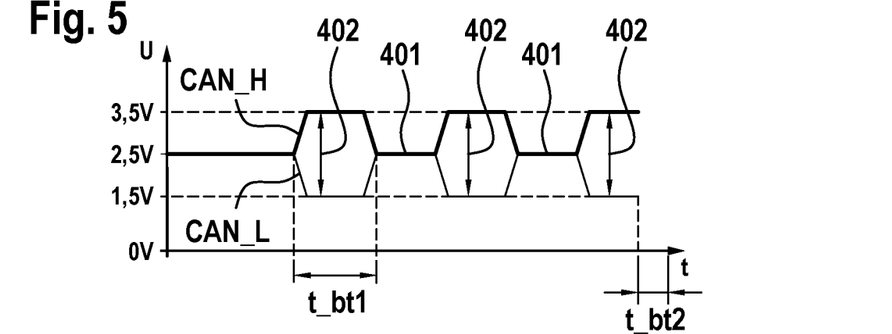
FIG. 5 shows a time profile of bus signals CAN_H and CAN_L at the subscriber station according to the first exemplary embodiment of the present invention.

From signals CAN_H and CAN_L received from the bus 40, which are shown in FIG. 5, the receiving module 122 forms a reception signal RxD, and forwards it to the communication control device 11, as shown in FIG. 4.

Figure 6:
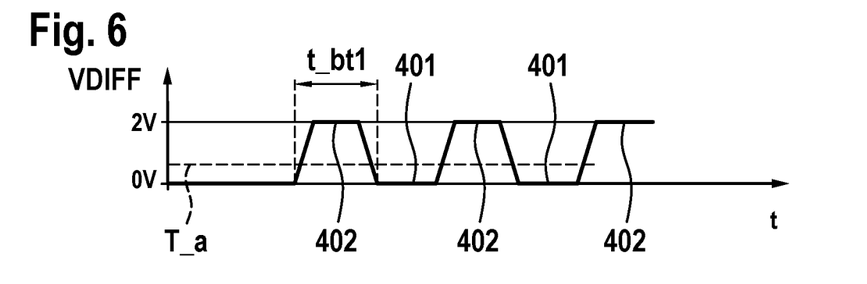
FIG. 6 shows a time profile of a differential voltage VDIFF of bus signals CAN_H and CAN_L at the subscriber station according to the first exemplary embodiment of the present invention.

According to the example of FIG. 5, the signals CAN-XL_H and CAN-XL_L have, at least in the arbitration phase 451, the dominant and recessive bus levels 401, 402, as conventional in CAN. A difference signal VDIFF=CAN-XL_H−CAN-XL_L, which is shown in FIG. 6 for the arbitration phase 451, is formed on the bus 40. The individual bits of the VDIFF signal with the bit time t_bt1 can be recognized in the arbitration phase 451 with a reception threshold T_a of, for example, 0.7 V. In the data phase 452, the bits of the signals CAN-XL_H and CAN-XL_L can be transmitted faster, that is to say with a shorter bit time t_bt2 than in the arbitration phase 451. In CAN FD und CAN XL, the signals CAN-XL_H and CAN-XL_L thus differ in the data phase 452 from the conventional signals CAN_H and CAN_L, at least in terms of their faster bit rate.

The sequence of states 401, 402 for the signals CAN-XL_H, CAN-XL_L in FIG. 5 and the resulting profile of the voltage VDIFF of FIG. 6 serves only to illustrate the function of the subscriber station 10. The sequence of the data states for the bus states 401, 402 can be selected as required.

In other words, the transmitting module 121, when it is switched into a first mode of operation B_451 (SLOW), according to FIG. 5 generates a first data state as bus state 402 with different bus levels for two bus wires 41, 42 of the bus line and a second data state as bus state 401 with the same bus level for the two bus wires 41, 42 of the bus line of the bus 40.

In addition, in a second operating mode B_452_TX (FAST_TX), which the data phase 452 comprises, the transmitting module 121 transmits the bits at a higher bit rate to the bus 40 for the time profiles of the signals CAN_H, CAN_L in CAN FD and CAN XL. In the data phase 452 of CAN XL, the CAN_H and CAN_L signals can also be generated with a physical layer different from that in CAN FD. As a result, the bit rate in the data phase 452 can be increased even further than in the case of CAN FD. At least in the case of CAN XL, a subscriber station (receiving node) will set a third operating mode B_452_RX (FAST_RX) in its transmitting/receiving device if this subscriber station is not a transmitter of the frame 450 in the data phase 452, i.e. is not a transmitting node.

In one operating mode B_LB (idle), the communication control device 11 is switched to the idle or standby state. That is to say, the communication control device is waiting for the reception of a message 45, 46. In this state, no communication takes place on the bus 40. In other words, no signal is received at the RxD terminal of the communication control device 11 of FIG. 4 or the value logical 1 is present, since the recessive level on the bus 40 corresponds to a bit value=1 or to a logical 1 in the reception signal RxD.

The mode of operation of the re-integration module 15, which differs from current communication standards for Classical CAN, for CAN FD and for CAN XL, is also described below with reference to FIG. 7 to FIG. 10. The propagation time differences present between the signals according to the example of FIG. 7 to FIG. 10, which are in particular due to transmission via the bus 40, are not shown in the figures for the sake of simplicity.

Figures 7, 8, 9:
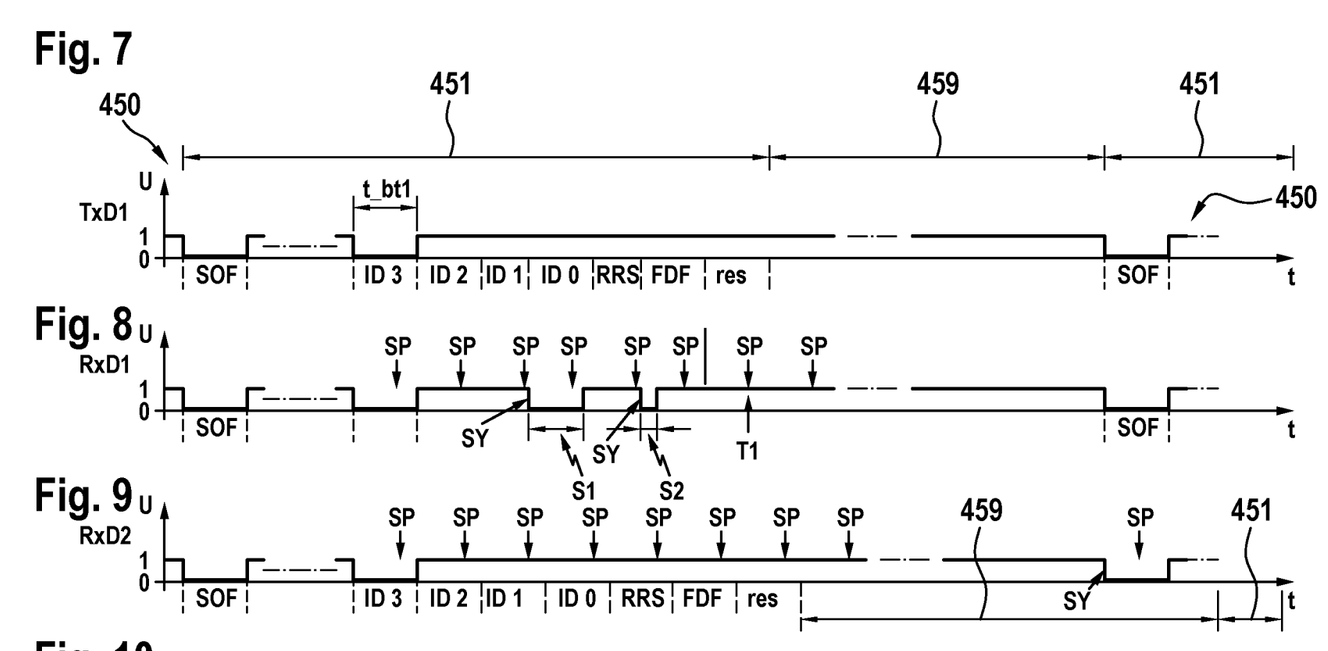
FIG. 7 and FIG. 8 in each case show a time profile of a digital transmission signal and of a digital reception signal during operation of the bus system at a first subscriber station which is connected with a second subscriber station to the same bus of the bus system.
FIG. 9 shows a time profile of a digital reception signal which the second subscriber station generates from a signal received from the bus when using a first re-integration condition, which signal is based on the transmission signal of the first subscriber station.

FIG. 7 shows a time profile of a digital transmission signal TxD1, which a first subscriber station, for example a subscriber station 10, generates over the time t for transmission to the bus 40 of the bus system 1. The first subscriber station transmits a CAN FD frame 450 with a 29-bit identifier.

FIG. 8 shows a time profile of a digital reception signal RxD1, which the first subscriber station generates from at least one signal received from the bus 40, as explained above with reference to FIG. 3 to FIG. 5.

For the generation of the digital reception signal RxD1 of FIG. 8, the transmitting/receiving device 12 reads off for the first subscriber station the signal VDIFF received from the bus 40 or at least one of the signals CAN_H, CAN_L at sample points SP, as is conventional. In the region of the last bit of the identifier (ID 0), the first subscriber station sees an external disturbance S1 of the RxD1 signal, as shown in FIG. 8. In the case of a falling edge of the digital reception signal RxD1, which are denoted by SY in FIG. 8, the first subscriber station synchronizes itself, as known to be provided, so that the communication control device 11 can transmit to the bus 40 synchronously with the other subscriber stations of the bus system 1. In the example in FIG. 7 and FIG. 8, the first subscriber station thus synchronizes itself to the disturbance S1 and reads off the ID 0 bit as dominant, so that the reception signal RxD1 has the bit value=0. As a result, the first subscriber station loses the arbitration for the current frame 450 and becomes the receiving node for the following data phase 452 on the bus 40. As a result, from the RRS bit in FIG. 8 there is now no longer a transmitting node on the CAN bus 40, since all user stations in the bus system 1 are now acting as receiving nodes.

According to FIG. 8, after the sample point SP of the RRS bit, the first subscriber station also sees a second external disturbance S2 in the reception signal RxD1. The first subscriber station synchronizes itself to this disturbance S2, as denoted by SY in FIG. 8.

It is therefore problematic that only the first subscriber station sees a first external disturbance S1 in the ID0 bit. A further problem is represented by the second external disturbance S2, which the first subscriber station sees in the FDF bit or after the sample point of the RRS bit. However, the other subscriber stations of the bus system 1 see neither the first external disturbance S1 nor the second external disturbance S2. In the case of the first subscriber station the disturbances S1, S2 are therefore local disturbances, which lead to a change in the signal at the bus 40.

A disturbance S1, S2 in FIG. 8 or an error, as shown with the jagged arrow in FIG. 1, can occur at any time during communication in the bus system 1. For example, an error can occur because, for example, incoming electromagnetic radiation has changed the level on the bus wires CAN_H and CAN_L and the subscriber station 10 as a receiving node has read off a fixed stuff bit as logical 0 during ongoing communication on the bus 40, although the fixed stuff bit was transmitted as logical 1. Of course, other errors are possible; in particular a single bit is read off with a different value than expected.

FIG. 9 shows a time profile of a second digital reception signal RxD2, which a second subscriber station generates from the signal received from the bus 40, as explained above with reference to FIG. 3 to FIG. 5. In this case, the second subscriber station proceeds according to the specifications for re-integration of the ISO11898-1:2015 standard for Classical CAN and CAN FD. These specifications are identical to the specifications for re-integration of the CiA610-1 standard for CAN XL. The second subscriber station is, for example, a second subscriber station 20 in which the second evaluation unit 1522 (FIG. 4) is not present or is switched off. As a result, the second subscriber station operates like a conventional subscriber station for Classical CAN or CAN FD.

As already mentioned, the second subscriber station does not see any disturbances S1, S2 in its reception signal RxD2. For this reason, the second subscriber station has not synchronized itself to the disturbances S1, S2 either. The second subscriber station therefore lags behind the first subscriber station, as can be seen from comparison of the reception signals RxD1 and RxD2 of FIG. 8 and FIG. 9.

Since there is no longer a transmitting node, the level on the CAN bus 40 is recessive. For this reason, at the sample point SP of their particular res bit, the first and the second subscriber station read off a bit value=1 (corresponding to recessive at the bus 40) for their reception signals RxD1, RxD2, as shown in FIG. 8 and FIG. 9. This means that the first and the second subscriber station each see a protocol exception event PAE.

For this reason, the first and the second subscriber station go into the re-integration phase 459 and re-integrate themselves from the next bit, which follows the res bit, as shown in FIG. 7 and FIG. 9.

Due to the two synchronizations after the disturbances S1, S2, the first subscriber station terminates the re-integration and thus the re-integration phase 459 after somewhat fewer than 11 bit times, as shown in shortened form in FIG. 7. For this purpose, in the case of a first subscriber station 10, the re-integration module 15 switches the associated communication control device 11 from the operating mode for the re-integration phase 459 into the operating mode of the arbitration phase 451, as illustrated in FIG. 7. Next, the first subscriber station 10 re-sends a frame 450, for example the frame which previously lost the arbitration.

According to FIG. 9, the second subscriber station 20 sees a falling edge in the signal on the bus 40 just before the sample point SP of the 11th bit of its re-integration in the phase 459, generates the reception signal RxD2 accordingly, and synchronizes itself to the falling edge, as denoted by SY in FIG. 9. The falling edge is caused by the start bit SOF in the transmission signal TxD1 of FIG. 7, which the first subscriber station 10 generates and has transmitted to the bus 40. The first subscriber station 10 does not synchronize itself to the start bit SOF it transmitted itself.

The re-integration module 25 of the second subscriber station 20 behaves in accordance with the current CAN standard according to ISO11898-1:2015. For this reason a time profile of the second reception signal RxD2 results at the conclusion of the phase 459, as shown with FIG. 9. In the re-integration, the subscriber station 20, i.e. also the re-integration module 25, uses the arbitration bit rate, whereas in the communication running on the bus 40 the shorter bits of the CAN FD data phase are optionally currently used.

Accordingly, in the case of the edge denoted by SY in FIG. 9, the synchronization in the second subscriber station 20 causes the communication control device 21, in particular its re-integration module, of the second subscriber station 20 to be reset for the re-integration. As a result, the re-integration restarts, whereby the phase 459 continues, the mode switch block 153 thus does not switch the communication control device 21 of the second subscriber station 20 into the arbitration phase 451. Alternatively, the re-integration module 25 can always check for the presence of the re-integration condition, even if the re-integration was successful and the communication control device 21 of the second subscriber station 20 is successfully integrated into the communication on the bus 40.

For the continuation/restarting of the re-integration, the evaluation block 152 in the detection block 151 in particular resets at least one counter for counting the bits received in the second reception signal RxD2 for the re-integration. The second subscriber station, more precisely its communication control device, is also switched into the operating mode for the phase 459. The second subscriber station is therefore not able to receive the frame which the first subscriber station 10 starts to transmit after the end of its phase 459 (FIG. 7). In FIG. 7, to simplify the representation, only the start bit SOF and the following bit of this frame 450 are shown. The second subscriber station is thus not able to receive the frame currently transmitted by the first subscriber station 10 with the transmission signal TxD1.

The resetting of at least one counter, in particular an idling counter, in the case of a sync edge SY causes no "false-positive" result to occur in the 11-bits detection if the short dominant bits of the CAN FD data phase lie, for example, only between the sample points and are therefore not sampled.

Figure 10:
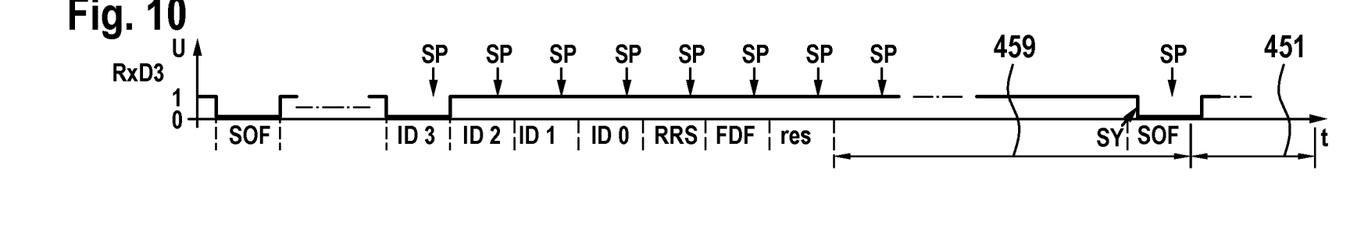
FIG. 10 shows a time profile of a digital reception signal which the second subscriber station generates from a signal received from the bus when using a second re-integration condition, which signal is based on the transmission signal of the first subscriber station.

In contrast to FIG. 9, FIG. 10 shows a time profile of a third digital reception signal RxD3, which a third subscriber station, for example a different subscriber station 10 or a subscriber station 30, generates from the signal received from the bus 40, as explained above with reference to FIG. 3 to FIG. 5. In this case, the third subscriber station, for example the other subscriber station 10, is present in accordance with the following specifications. These deviate from the re-integration specifications of the ISO11898-1:2015 standard for Classical CAN and CAN FD and the re-integration specifications of the standard CiA610-1 for CAN XL, as follows.

For the conclusion of the re-integration into the communication on the bus 40, which the third subscriber station 10 carries out, for example after a protocol exception event PAE or after a wake-up from a sleep state, the re-integration module 15 switches the associated communication control device 11 into the operating mode of the arbitration phase 451 when one of the following conditions applies.

Here the device 15 effects the re-integration of the associated communication control device 11, more precisely its CAN FD controller or CAN XL controller, into the communication on the bus 40, A) if the re-integration module 15, more precisely the first evaluation unit 1521, samples—more precisely the detection block 151 detects, in particular counts—a number of 11 successive recessive bits in the at least one signal from the bus 40 (corresponds to bit value=1 in the signal RxD2 or RxD3), as described above with respect to FIG. 7 to FIG. 9, OR also B) if the re-integration module 15, more precisely the second evaluation unit 1522, samples—more precisely the detection block 151 detects, in particular counts—a number of 10 consecutive recessive bits in the at least one signal from the bus 40 (corresponds to bit value=1 in the signal RxD2 or RxD3), followed by a dominant bit (corresponds to bit value=0 in the signal RxD2 or RxD3), as described above with respect to FIG. 7 to FIG. 9.

Accordingly, a subscriber station which is switched into the operating mode for the re-integration phase 459 and which samples a dominant bit in the 11th bit of the re-integration (corresponds to bit value=0 in the signal RxD3), this 11th bit as the start bit SF of a new frame, as illustrated in FIG. 10.

In addition, a synchronization before the sample point SP of the 10th bit leads to the restart of the re-integration. In contrast thereto, a synchronization after the sample point SP of the 10th bit is assumed to be the beginning of a start bit SOF of the next frame and does not lead to the restart of the re-integration and thus to retaining the mode of operation for the re-integration phase 459.

Consequently, both re-integration conditions are identical up to the sample point SP of the 10th recessive bit. From the aforementioned sample point SP, the reset-on-sync function is switched off in the re-integrating subscriber station. According to the preceding description of the figures, the re-integration in the re-integrating subscriber station is then concluded at the sample point SP of the bit which follows the 10th recessive bit. If the bit following the 10th recessive bit is recessive, "idle" is detected. Otherwise, in particular if the bit following the 10th recessive bit is dominant, "start-of-frame" or the SOF bit will be detected.

What is more, a subscriber station, if the subscriber station has no frame to be transmitted, should become the receiver of this frame. Such a subscriber station generates, for example, the third reception signal RxD3, which is shown in FIG. 10.

Under the aforementioned preconditions, FIG. 7, FIG. 8 and FIG. 10 are explained as follows.

For example, a different subscriber station 10 generates the third reception signal RxD3, as shown in FIG. 10. Alternatively, a subscriber station 20 or 30 in FIG. 1 can also proceed, as described below. In the example shown in FIG. 7 and FIG. 10, the reception signal RxD3 results from the embodiment of the change module 15, in particular of its evaluation unit 1522, with a behavior with tolerance during re-integration, as described above.

Consequently, the synchronization SY according to FIG. 10 at the subscriber station 10 does not cause the evaluation block 152 of the re-integration module 15 to restart detection with the detection block 151, in particular to reset its at least one bit counter for the re-integration. Instead, according to the reception signal RxD3 at the sample point SP of the 11th bit of the re-integration, the subscriber station 10 samples a dominant bit, from which the bit value=0 of the reception signal RxD3 follows. The subscriber station 10, in particular its second evaluation unit 1522, accepts this dominant (0) bit as the start bit SOF of a new CAN frame 450. For this reason, the subscriber station 10, in particular its block 152 and/or switch block 153, terminates the re-integration and becomes the receiver of the CAN frame 450, as shown in FIG. 10. The subscriber station 10, in particular its switch block 153, switches its operating mode into the operating mode of the arbitration phase 451.

A special situation can thus be avoided in which the subscriber station 10 has already completed the re-integration earlier than after the 11 bits of the known idle condition and at least one conventional subscriber station has evaluated the first bit of the frame 450 or 460, which the subscriber station 10 then transmits immediately after the re-integration, as the non-presence of the predetermined idle condition, since the conventional subscriber station has previously only counted 10 recessive bits in phase 459 (re-integration). This subscriber station 10 can solve the problems described in the following special but undesirable situations:

(1) In the case of a Classical CAN subscriber station (node), which re-integrates itself due to a CAN FD frame 450.

(2) When a CAN FD frame 450 with a 29-bit identifier is received, when all transmitting nodes lose the arbitration in the last bits of the identifier (ID) due to an external disturbance, as described with reference to FIG. 7 to FIG. 10.

(3) When a CAN XL frame 460 is received, when the CAN XL node uses the "error signaling" setting, so that in the event of an error detected by the subscriber station in the communication or in the reception signal, no error signaling takes place, and the transmitting node of the CAN XL frame 460 loses the arbitration due to an external disturbance S1, S2 in the last bits of the identifier (ID), as described with reference to FIG. 7 to FIG. 8 for a CAN FD frame 450.

In all of these aforementioned special situations, the re-integration of a subscriber station 10, 20, 30 on the bus 40 into the communication on the bus 40 can be improved.

As a result, the communication in the bus system can take place with a high net data rate and also with a high error robustness.

According to a second exemplary embodiment, the subscriber station 10 proceeds as follows if in the re-integration mode the subscriber station 10 has sampled the 11th bit as dominant.

Accordingly, a subscriber station 10, regardless of whether the subscriber station has or has not a frame to be transmitted, is not permitted to send this frame immediately. That is to say, the subscriber station 10 is only permitted to act as a receiving node for the next frame but not as a transmitting node. The subscriber station is thus only permitted to receive in the next cycle on the bus 40 and not to transmit.

For this reason, the mode switch block 153 switches the operating mode of the communication control device 11 after the re-integration phase 459 into a reception mode for the arbitration phase 451. The communication control device 11 therefore has to wait for the transmission of frames 450, 460 until at least one communication cycle with the phases 451, 452 is completed for the next frame 450 or 460. For this purpose, the evaluation block 152 can use an additional counter which counts the communication cycles, for example by incrementing the count value of the counter after each switching between the phases 451, 452.

As a result, the re-integrating subscriber station 10 cannot disturb the CAN bus 40. This is particularly advantageous if the subscriber station 10 has a technical problem that was the reason for the re-integration.

At least one of the subscriber stations 20, 30 can be designed in the same way as described above for the subscriber station 10 in the present exemplary embodiment.

Since the aforementioned error cases cannot occur in the case of the subscriber stations 10, 20, 30, the communication on the bus 40 is not unintentionally disturbed.

As a result, the communication in the bus system can take place with a high error robustness and a high net data rate.

All above-described embodiments of the subscriber stations 10, 20, 30, of the bus system 1 and the method executed therein can be used individually or in all possible combinations. In particular, all features of the above-described exemplary embodiments and/or their modifications can be combined as desired. Additionally or alternatively, the following modifications are possible in particular.

Even if the present invention is described above using the example of the CAN bus system, the present invention can be used in any communication network and/or communication method in which two different communication phases are used in which the bus states generated for the different communication phases are different.

In particular, the bus system 1 according to the exemplary embodiments can be a communication network in which data can be transmitted in series at two different bit rates. It is advantageous, but not necessarily a prerequisite, for an exclusive, collision-free access of a subscriber station 10, 20, 30 to a common channel to be ensured for the bus system 1, at least for certain time periods.

In the exemplary embodiments the number and arrangement of the subscriber stations 10, 20, 30 in the bus system 1 is arbitrary. In particular, the subscriber station 20 in the bus system 1 can be omitted. It is possible for one or more of the subscriber stations 10 or 30 to be present in the bus system 1. It is possible for all subscriber stations in the bus system 1 to be configured identically, that is to say only the subscriber station 10 or only the subscriber station 20 or only subscriber station 30 are present.

It is possible, in a subscriber station 20, for the re-integration module to be arranged separately from the communication control device 21.

In CAN FD and CAN XL, error signaling is active for errors occurring during communication on the bus. In CAN XL, error signaling can be switched off. If error signaling is switched off, the Classical CAN and the CAN FD frame formats are no longer transmitted and are evaluated as a format error in the reception case. The signaling can take place in particular by transmitting error flags to the bus. In this case, upward of a certain number of detected errors, user stations of the bus system can switch into a so-called "error-passive" state. If a subscriber station has switched into this error-passive state, this subscriber station will not be permitted to transmit an active error flag to the CAN bus but only a passive error flag. Because of this, this subscriber station will not be able to disturb the communication on the CAN bus. Following an error flag, a subscriber station (node) always also sends an error delimiter, which consists exclusively of recessive bits.

However, in the standard ISO11898-1:2015 for CAN FD and in the specification CiA610-1, it is currently provided for CAN XL that such a subscriber station in the error passive state, if it sees an error, must transmit a passive error flag to the CAN bus in response to the error. Such an error can be a local error, for example. A local error is an error that only this subscriber station sees.

For transmitting the passive error flag, this subscriber station will switch into an operating mode for transmitting signals in the arbitration phase if the subscriber station has not already switched into this operating mode. However, if a communication in the data phase of a CAN FD frame or of a CAN XL frame is taking place at this time on the bus, wherein the bit rate of the data phase is set to be greater than in the arbitration phase, the subscriber station samples the communications on the bus at a different bit rate than the bit rate of the data phase in progress. The subscriber stations can therefore randomly sample the passive error flag, i.e. also the error limiter, and therefore recognize it as transmitted validly on the bus. This can lead to the communication on the bus being disturbed unintentionally.

What is claimed is:

1. A subscriber station for a serial bus system, comprising:
   a communication control device configured to control a communication of the subscriber station with at least one other subscriber station of the bus system and to evaluate at least one signal received from a bus of the bus system, wherein in the at least one signal, a bit time in a first communication phase can differ from a bit time in a second communication phase; and
   a re-integration module configured to re-integrate the communication control device into a communication on the bus to temporally synchronize the communication control device to a signal transmitted from the at least one other subscriber station of the bus system, which the signal is created based on a frame for communication in the bus system;
   wherein the re-integration module is configured to check at least one predetermined re-integration condition in order to decide whether the operating mode of the communication control device is or is not to be switched into an operating mode for transmitting frames to the bus and/or receiving frames from the bus; and
   wherein the re-integration module is configured to use in the check at least one predetermined re-integration condition having a sequence of bits in which a value of a last bit of the sequence differs from that of preceding bits of the sequence.

2. The subscriber station according to claim 1, wherein the last bit of the at least one predetermined re-integration condition is a start bit of a next frame which the subscriber station receives from the bus.

3. The subscriber station according to claim 1, wherein the re-integration module is configured to check, in addition to a first predetermined re-integration condition, a second predetermined re-integration condition for bits currently received from the bus to decide whether the operating mode of the communication control device is or is not to be switched into the operating mode for transmitting and/or receiving frames.

4. The subscriber station according to claim 3, wherein the first predetermined re-integration condition has a predetermined number of consecutive bits that all have the same bit value, and wherein the second predetermined re-integration condition has a sequence of bits in which a logical value of a last bit of the sequence of bits differs from the logical value of preceding bits in the sequence of bits.

5. The subscriber station according to claim 4, wherein the number of bits in the first and the second predetermined re-integration condition is the same.

6. The subscriber station according to claim 1, wherein the communication control device is configured to synchronize to an edge during a re-integration of the re-integration module, the edge being an edge of a bit of the predetermined re-integration condition.

7. The subscriber station according to claim 4, wherein the re-integration module is configured to evaluate an edge to which the communication control device is synchronized and which is present after a sample point of a 10th bit in the sequence of bits of the second predetermined re-integration condition as a beginning of a start bit of a next frame on the bus.

8. The subscriber station according to claim 7, wherein the re-integration module is configured to, in an operating mode for re-integration, restart a search for the predetermined re-integration condition in the signal received from the bus every time the re-integration module has detected a falling edge in the signal received from the bus, wherein the edge is not evaluated by the re-integration module as a start of the start bit of the next frame on the bus.

9. The subscriber station according to claim 7, wherein the re-integration module is configured to switch the communication control device after the edge into an operating mode for transmitting and receiving frames, and wherein the re-integration module is configured to instruct the communication control device to transmit without a start bit a frame to be transmitted and to begin transmission of the frame to be transmitted with a first bit of its identifier.

10. The subscriber station according to claim 7, wherein the re-integration module is configured to switch the communication control device after the edge into an operating mode for only receiving frames when the communication control device currently does not have a frame to be transmitted.

11. The subscriber station according to claim 1, wherein the re-integration module includes:
a detection block configured to detect a logical value of bits and a number of consecutive bits with the same logical value in the signal received from the bus;
an evaluation block configured to evaluate a detection result of the detection block based on the at least one re-integration condition; and
a mode switch block configured to switch the operating mode of the communication control device based on the evaluation performed by the evaluation block.

12. The subscriber station according to claim 1, wherein the communication control device is configured to sample and evaluate the at least one signal received from the bus, the at least one signal being based on a transmission signal generated by another subscriber station, doing so according to a predetermined frame.

13. The subscriber station according to claim 1, wherein the subscriber station is a Classical CAN subscriber station and/or a CAN FD subscriber station.

14. The subscriber station according to claim 1, wherein the subscriber station is a CAN FD subscriber station and/or a CAN XL subscriber station.

15. The subscriber station according to claim 1, wherein the communication control device is configured to, in the first communication phase, negotiate with other subscriber stations as to which of the subscriber stations of the bus system will be given at least temporarily exclusive, collision-free access to the bus in a subsequent second communication phase.

16. A bus system, comprising:
a bus; and
at least two subscriber stations which are connected to one another via the bus in such a way that they can communicate in series with one another and of which at least one subscriber station is a subscriber station including:
a communication control device configured to control a communication of the subscriber station with at least one other subscriber station of the bus system and to evaluate at least one signal received from a bus of the bus system, wherein in the at least one signal, a bit time in a first communication phase can differ from a bit time in a second communication phase, and
a re-integration module configured to re-integrate the communication control device into a communication on the bus to temporally synchronize the communication control device to a signal transmitted from the at least one other subscriber station of the bus system, which the signal is created based on a frame for communication in the bus system,
wherein the re-integration module is configured to check at least one predetermined re-integration condition in order to decide whether the operating mode of the communication control device is or is not to be switched into an operating mode for transmitting frames to the bus and/or receiving frames from the bus, and
wherein the re-integration module is configured to use in the check at least one predetermined re-integration condition having a sequence of bits in which a value of a last bit differs from that of preceding bits;
wherein each of the at least two subscriber stations also has a transmitting/receiving device for transmitting a transmission signal to the bus of the bus system and/or for receiving a signal from the bus of the bus system.

17. A method for communication in a serial bus system, wherein the method is carried out with a subscriber station of the bus system includes a communication control device and a re-integration module, wherein the method comprises the following steps:
controlling, with the communication control device, a communication of the subscriber station with at least one other subscriber station of the bus system and evaluating a signal received from a bus of the bus system, in which signal a bit time in a first communication phase can differ from a bit time in a second communication phase; and performing a re-integration with the re-integration module for re-integrating the communication control device into a communication on the bus in order to temporally synchronize the communication control device to a signal transmitted from the at least one other subscriber station of the bus system, the transmitted signal having been created based on a frame for communication in the bus system;

wherein the re-integration module checks at least one predetermined re-integration condition in order to decide whether an operating mode of the communication control device is or is not to be switched into an operating mode for transmitting frames to the bus and/or receiving frame from the bus, and wherein the re-integration module uses in its check at least one predetermined re-integration condition having a sequence of bits in which a value of a last bit of the sequence differs from that of preceding bits of the sequence.

* * * * *